(12) United States Patent
Hohner

(10) Patent No.: US 6,211,303 B1
(45) Date of Patent: *Apr. 3, 2001

(54) PROCESS FOR THE OXIDATION OF POLYETHYLENE WAXES

(75) Inventor: Gerd Hohner, Gersthofen (DE)

(73) Assignee: Clariant GmbH, Frankfurt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/114,016

(22) Filed: Jul. 10, 1998

(30) Foreign Application Priority Data

Jul. 11, 1997 (DE) .................................. 197 29 835
Mar. 13, 1998 (DE) .................................. 198 10 890

(51) Int. Cl.⁷ ........................................... C08F 8/06
(52) U.S. Cl. ................ 525/388; 525/327.9; 525/333.7; 525/333.8; 525/340; 525/383; 525/386
(58) Field of Search .................... 525/388, 383, 525/333.7, 340, 327.9, 333.8

(56) References Cited

U.S. PATENT DOCUMENTS

| | | |
|---|---|---|
| 3,201,381 | 8/1965 | Hagemeyer, Jr. et al. . |
| 3,278,513 | 10/1966 | Jahrstorfer et al. . |
| 3,285,902 | 11/1966 | Schmeidl . |
| 3,692,877 | 9/1972 | Shibahara et al. . |
| 3,756,999 | 9/1973 | Stetter et al. . |
| 4,011,380 | 3/1977 | West et al. . |
| 4,028,436 | 6/1977 | Bogan et al. . |
| 4,039,560 | 8/1977 | Tomoshige . |
| 4,962,262 | 10/1990 | Winter et al. . |
| 5,023,388 | 6/1991 | Luker . |
| 5,252,677 | 10/1993 | Tomita et al. . |
| 5,306,772 | * 4/1994 | Mimura ................................ 525/92 |
| 5,723,705 | 3/1998 | Herrmann et al. . |
| 5,750,813 | * 5/1998 | Hess .................................... 585/12 |

FOREIGN PATENT DOCUMENTS

| | | |
|---|---|---|
| 1227654 | 2/1962 | (DE) . |
| 1301094 | 8/1969 | (DE) . |
| 2241057 | 3/1973 | (DE) . |
| 3047915 | 7/1982 | (DE) . |
| 283730 | 10/1990 | (DE) . |
| 321851 | 6/1989 | (EP) . |
| 321852 | 6/1989 | (EP) . |
| 0487278 | 5/1992 | (EP) . |
| 571882 | 12/1993 | (EP) . |
| 602509 | 6/1994 | (EP) . |
| 1360659 | 3/1964 | (FR) . |
| 2101828 | 3/1972 | (FR) . |
| 2497513 | 7/1982 | (FR) . |

* cited by examiner

Primary Examiner—Fred Zitomer
(74) Attorney, Agent, or Firm—Susan S. Jackson; Scott E. Hanf

(57) ABSTRACT

The present invention relates to a process for the oxidation, in the melt by means of oxygen or oxygen-containing gas mixtures, of ethylene homopolymer and copolymer waxes prepared using metallocene catalysts, wherein the oxidation of the polyethylene wax is carried out with addition of monobasic or polybasic inorganic acids or monobasic or polybasic carboxylic acids having from 1 to 6 or from 2 to 6 carbon atoms.

The process gives waxes having a low melt viscosity and a light color.

9 Claims, No Drawings

PROCESS FOR THE OXIDATION OF POLYETHYLENE WAXES

BACKGROUND OF THE INVENTION

The invention relates to a process for preparing polar wax products by oxidation of nonpolar polyethylene waxes prepared using metallocene catalysts. For the purposes of the present invention, the term "polyethylene waxes" refers to both ethylene homopolymers and copolymers of ethylene with α-olefins having a chain length of $C_3$-$C_{18}$, each having a melt viscosity measured at 140° C. of from 5 to 20000 mPa.s.

It is known that nonpolar polyethylene waxes can be oxidized to form polar waxes. Such oxidation products of waxes and processes for preparing them are described, for example, in U.S. Pat. No. 3,278,513, DE-A-1227654, DE-A-2241057 and DD 283730. The nonpolar starting materials are generally reacted by treating their melts with oxygen or oxygen-containing, possibly additionally ozone-containing, gas mixtures.

As auxiliaries for initiating the oxidation reaction, oxidized polyethylene waxes can be added to the raw material. For example, U.S. Pat. No. 3,692,877 describes the addition of low molecular weight oxidized polyolefins having molar masses of from 500 to 10000. Such oxidized polyolefins comprise long-chain carboxylic acids having average chain lengths of greater than 35.

Depending on the conditions and the duration of the reaction, different degrees of oxidation can be set. The resulting reaction products contain many oxygen-functional groups, e.g. carboxyl, ester, carbonyl and hydroxyl groups. The degree of oxidation is usually characterized by means of the acid number which is a measure of the concentration of carboxyl functions present.

The oxidized polyolefin waxes obtained in this way are employed, inter alia, as auxiliaries for plastics processing or for producing aqueous dispersions, e.g. for use in cleaners and polishers, in textile processing, for waterproofing and for coating citrus fruits.

The polyethylene waxes used as raw material for the oxidation are, for example, obtained by thermal degradation of high molecular weight polyethylene or by free-radical polymerization of ethylene by the high pressure process, also by metal-catalyzed homopolymerization of ethylene or metal-catalyzed copolymerization of ethylene with α-olefins. Suitable metal catalysts are those of the Ziegler-Natta type or, more recently, also metallocene compounds. The latter contain titanium, zirconium or hafnium atoms as active species and are generally used in combination with cocatalysts, e.g. organoaluminum or boron compounds, preferably aluminoxane compounds. If necessary, the polymerization is carried out in the presence of hydrogen as molar mass regulator.

Corresponding polymerization processes which employ metallocene catalysts are described, for example, in EP-A-321 851, EP-A-321852, EP-A-571882 and EP-A-602509. Compared to Ziegler-Natta systems, metallocene catalysts display extremely high activities. The amounts of catalyst needed are so low that they do not interfere in oxidative further processing of the waxes. Decomposition and removal of the metallocene catalysts, which is associated with considerable expense, can be omitted. The metallocene-catalyzed polymerization allows the synthesis of polymer waxes having widely variable properties, sometimes novel property combinations, so that specific use requirements can be set in a more targeted manner than is possible using conventional polymerization processes. The same is also true for the oxidation products obtainable from such polymer waxes.

A disadvantage which has been found in the oxidation of wax-like polyolefins prepared using metallocenes is the formation of high molecular weight by-products, in the extreme case gel-like, crosslinked by-products. This can lead to an increase in the viscosity of the reaction mixture during the reaction, as a result of which mixing of the reaction mixture with oxygen is hindered and the reaction rate is reduced. Furthermore, deposits are formed on the walls and internal fittings of the oxidation reactor and the use quality of the products, for example the color, are impaired. This behavior is observed particularly when the reaction is carried out in an economically advantageous manner using air as oxidant and at atmospheric pressure or slight superatmospheric pressure.

It has now surprisingly been found that the disadvantages indicated can be avoided by adding a low concentration of inorganic or organic acids to the reaction mixture before commencement or in the early stage of the oxidation.

SUMMARY OF THE INVENTION

The invention accordingly provides a process for the oxidation, in the melt by means of oxygen or oxygen-containing gas mixtures, of ethylene homopolymers and copolymer waxes prepared by means of metallocene catalysts, wherein the oxidation is carried out with addition of monobasic or polybasic inorganic acids or monobasic or polybasic carboxylic acids having 1–6 or 2–6 carbon atoms and the amount added is, based on the wax raw material, from 0.01 to 1.0% by weight.

DESCRIPTION OF THE PREFERRED EMBODIMENTS

Suitable polyethylene wax raw materials are homopolymers of ethylene or copolymers of ethylene with one or more α-olefins. α-Olefins used are linear or branched olefins having 3–18 carbon atoms. Examples of such olefins are propene, 1-butene, 1-hexene, 1-octene or 1-octadecene, also styrene. Preference is given to ethylene homopolymers and copolymers of ethylene with propene or 1-butene. The copolymers comprise 70–99.9% by weight, preferably 80–99% by weight, of ethylene.

Examples of metallocene catalysts used for preparing the polyolefin wax raw materials are:

bis(1,2,3-trimethylcyclopentadienyl)zirconium dichloride,
bis(1,2,4-trimethylcyclopentadienyl)zirconium dichloride,
bis(1,2-dimethylcyclopentadienyl)zirconium dichloride,
bis(1,3-dimethylcyclopentadienyl)zirconium dichloride,
bis(1-methylindenyl)zirconium dichloride,
bis(1-n-butyl-3-methylcyclopentadienyl)zirconium dichloride,
bis(2-methyl-4,6-di-i-propylindenyl)zirconium dichloride,
bis(2-methylindenyl)zirconium dichloride,
bis(4-methylindenyl)zirconium dichloride,
bis(5-methylindenyl)zirconium dichloride,
bis(alkylcyclopentadienyl)zirconium dichloride,
bis(alkylindenyl)zirconium dichloride,
bis(cyclopentadienyl)zirconium dichloride,
bis(indenyl)zirconium dichloride,
bis(methylcyclopentadienyl)zirconium dichloride,
bis(n-butylcyclopentadienyl)zirconium dichloride,
bis(octadecylcyclopentadienyl)zirconium dichloride,
bis(pentamethylcyclopentadienyl)zirconium dichloride, bis(trimethylsilylcyclopentadienyl)zirconium dichloride,
biscyclopentadienyldibenzylzirconium,
biscyclopentadienyldimethylzirconium,
bistetrahydroindenylzirconium dichloride,
dimethylsilyl-9-fluorenylcyclopentadienylzirconium dichloride,
dimethylsilylbis-1-(2,3,5-trimethylcyclopentadienyl) zirconium dichloride,
dimethylsilylbis-1-(2,4-dimethylcyclopentadienyl) zirconium dichloride,
dimethylsilylbis-1-(2-methyl-4,5-benzindenyl)zirconium dichloride,
dimethylsilylbis-1-(2-methyl-4-ethylindenyl)zirconium dichloride,
dimethylsilylbis-1-(2-methyl-4-i-propylindenyl)zirconium dichloride,
dimethylsilylbis-1-(2-methyl-4-phenylindenyl)zirconium dichloride,
dimethylsilylbis-1-(2-methylindenyl)zirconium dichloride,
dimethylsilylbis-1-(2-methyltetrahydroindenyl)zirconium dichloride,
dimethylsilylbis-1-indenylzirconium dichloride,
dimethylsilylbis-1-indenyldimethylzirconium,
dimethylsilylbis-1-tetrahydroindenylzirconium dichloride,
diphenylmethylene-9-fluorenylcyclopentadienylzirconium dichloride,
diphenylsilylbis-1-indenylzirconium dichloride,
ethylenebis-1-(2-methyl-4,5-benzindenyl)zirconium dichloride,
ethylenebis-1-(2-methyl-4-phenylindenyl)zirconium dichloride,
ethylenebis-1-(2-methyltetrahydroindenyl)zirconium dichloride,
ethylenebis-1-(4,7-dimethylindenyl)zirconium dichloride,
ethylenebis-1-indenylzirconium dichloride,
ethylenebis-1-tetrahydroindenylzirconium dichloride,
indenyl-cyclopentadienyl-zirconium dichloride
Isopropylidene(1-indenyl)(cyclopentadienyl)zirconium dichloride,
Isopropylidene(9-fluorenyl)(cyclopentadienyl)zirconium dichloride,
phenylmethylsilylbis-1-(2-methylindenyl)zirconium dichloride.

The oxidation of the polyolefin waxes can be carried out batchwise or continuously. In the case of the batchwise procedure, oxygen or oxygen-containing gas is passed into the molten wax raw material, if necessary with removal of the heat of reaction, until the desired degree of oxidation is reached. The acid addition according to the present invention can be carried out before or after commencement of gas introduction. The oxidant used is oxygen or an oxygen-containing gas mixture, preferably air. The reaction temperatures are usually in the range from the melting point of the raw material and 200° C., preferably from 120 to 180° C., particularly preferably from 140 to 170° C. The reaction can be carried out at atmospheric pressure or under superatmospheric pressure. Preference is given to pressures of from 1 to 3 bar. Suitable acids are monobasic or polybasic inorganic or organic acids. Examples of inorganic acids are hydrochloric, sulfuric and phosphoric acid. Examples of organic acids are monocarboxylic acids having a chain length of from 1 to 4, e.g. formic, acetic, propionic or butyric acid, also polybasic carboxylic acids having 2–6 carbon atoms, e.g. oxalic acid, malonic acid, succinic acid, maleic acid, malic acid or citric acid. Among the inorganic acids, preference is given to phosphoric acid; among the carboxylic acids, preference is given to monocarboxylic acids, in particular acetic and propionic acid. Particular preference is given to using acetic acid. The acid is added in an amount of from 0.01 to 1% by weight, preferably from 0.05 to 0.5% by weight, based on the wax raw material used.

In the case of a continuous procedure, wax, oxidant and acid are passed together through a suitable reaction vessel, for example a bubble column reactor, and the wax product formed is taken off. Otherwise, the abovementioned conditions apply.

The invention is illustrated by the following examples without being restricted to these examples.

The melt viscosities of the waxes described below were determined in accordance with DIN 51562 using a rotation viscometer, the drop points were determined in accordance with DIN 51801/2, the acid/saponification numbers were determined in accordance with DIN 53402/401 and the densities were determined at 20° C. in accordance with DIN 53479. The color determination was carried out visually at room temperature by means of a set of comparative samples (grade 1: colorless, grade 6: yellow-brown).

As in the procedure described in EP-A-571882, polyolefin waxes were prepared using metallocene catalysts and employed as raw materials for the subsequent oxidation. The property data of these waxes and the catalysts used are listed in the following table:

TABLE 1

Wax raw materials used

| Wax No. | Type of wax | Metallocene catalyst | Melt viscosity/ 140° C. mPas | Drop point ° C. | Density g/cm$^3$ |
|---|---|---|---|---|---|
| 1 | ethylene-propene copolymer | bis(n-butylcyclopentadienyl)zirconium dichloride | 530 | 113 | 0.940 |
| 2 | ethylene-homopolymer | bis(methylcyclopentadienyl)zirconium dichloride | 620 | 126 | 0.960 |
| 3 | ethylene-homopolymer | bis(methylcyclopentadienyl)zirconium dichloride | 790 | 125 | 0.962 |
| 4 | ethylene-propene copolymer | ethylenebis-1-tetrahydroindenyl-zirconium dichloride | 610 | 105 | 0.925 |
| 5 | ethylene-homopolymer | dimethylsilylbis-1-(2-methyl-4,5-benzindenyl)-zirconium dichloride | 530 | 127 | 0.959 |

EXAMPLE 1

In a 2 l four-necked flask fitted with thermometer, high-speed propeller stirrer and a gas inlet tube reaching down into the flask, a mixture of 700 g of wax 1 from Table 1 and 35 g of an oxidized polyethylene wax having an acid number of 25 mg KOH/g was melted. After reaching an internal temperature of 140° C., 0.7 g of acetic acid was added, the stirrer was switched on at 4000 revolutions per minute and an air stream of 200 l/h was passed into the melt. The reaction temperature rose to a maximum of 165° C. Samples for determining the viscosity were taken at intervals of 2 hours. The reaction was stopped after 8 hours. The product formed had an acid number of 17 mg KOH/g, a viscosity of 180 mPa.s at 140° C. and a color grade of 1–2.

The viscosities of the samples taken during the reaction were as follows:

| Sample taken after | Viscosity/140° C. mPa · s |
|---|---|
| 0 h | 530 |
| 2 h | 320 |
| 4 h | 230 |
| 6 h | 190 |
| 8 h (final product) | 180 |

EXAMPLE 2

An oxidation was carried out using the procedure of Example 1 except that 0.6 g of phosphoric acid instead of the acetic acid was added to the reaction mixture. After 8 hours, a wax oxidation product having an acid number of 18 mg KOH/g, a viscosity of 250 mPa.s at 140° C. and a color grade of 2 was obtained.

The viscosities of the samples taken during the reaction were as follows:

| Sample taken after | Viscosity/140° C. mPa · s |
|---|---|
| 0 h | 530 |
| 2 h | 340 |
| 4 h | 280 |
| 6 h | 260 |
| 8 h (final product) | 250 |

Comparative Example 1

An oxidation was carried out using the procedure of Example 1, but omitting the addition of acetic acid. The product obtained after an oxidation time of 8 hours had a viscosity of 830 mPa.s at 140° C., an acid number of 15 mg KOH/g and a color grade of 3.

The viscosities of the samples taken during the reaction were as follows:

| Sample taken after | Viscosity/l40° C. mPa · s |
|---|---|
| 0 h | 530 |
| 2 h | 430 |
| 4 h | 380 |
| 6 h | 510 |
| 8 h (final product) | 830 |

Comparative Example 1 shows that during the oxidation the viscosity drops initially and then rises again. The viscosity of the final product is significantly above that of the starting material. In contrast, in the presence of acetic or phosphoric acid a continuous decrease in viscosity is observed right to the end of the reaction; the reaction rate is higher (higher acid number) and the product color is lighter.

EXAMPLE 3

700 g of wax 2 from Table 1 were mixed with 35 g of an oxidized polyethylene wax having an acid number of 25 mg KOH/g and 0.9 g of propionic acid and oxidized using the apparatus described in Example 1 under the conditions indicated there. After 8 hours, a wax oxidation product having an acid number of 18 mg KOH/g, a saponification number of 40 mg KOH/g, a melt viscosity of 280 mPa.s at 140° C., a drop point of 112° C. and a color grade of 1–2 was obtained.

Comparative Example 2

The oxidation of the same polyethylene wax by the method described in Example 2 but without addition of propionic acid led, after 8 hours, to a wax oxidation product having an acid number of 14 mg KOH/g, a melt viscosity at 140° C. of 650 mPa.s and a color grade of 3.

EXAMPLE 4

700 g of wax 3 from Table 1 were oxidized as described in Example 1 in the presence of 35 g of an oxidized polyethylene wax having an acid number of 25 mg KOH/g with addition of 0.7 g of acetic acid. After 7 hours, a product having an acid number of 16, a melt viscosity at 140° C. of 510 mPa.s and a color grade of 2 was obtained.

Comparative Example 3

An oxidation carried out using the procedure of Example 3 but without addition of acetic acid had to be stopped after 6.5 hours at an acid number of 9 mg KOH/g because the reaction mixture started to crosslink.

EXAMPLE 5

700 g of wax 4 from Table 1 were mixed with 35 g of an oxidized polyethylene wax having an acid number of 25 mg KOH/g and 0.9 g of acetic acid and oxidized using the apparatus described in Example 1 under the conditions indicated there. After 7 hours, a wax oxidation product having an acid number of 2 mg KOH/g, a melt viscosity of 280 mPa.s at 140° C. and a color grade of 1–2 was obtained.

Comparative Example 4

The oxidation of the same polyethylene wax by the method described in Example 5 but without addition of acetic acid led, after 7 hours, to a wax oxidation product having an acid number of 18 mg KOH/g, a melt viscosity at 140° C. of 590 mPa.s and a color grade of 3.

EXAMPLE 6

700 g of wax 5 from Table 1 were mixed with 35 g of an oxidized polyethylene wax having an acid number of 25 mg KOH/g and 0.7 g of acetic acid and oxidized using the apparatus described in Example 1 under the conditions indicated there. After 8.5 hours, a wax oxidation product having an acid number of 22 mg KOH/g, a melt viscosity of 220 mpa.s at 140° C. and a color grade of 1–2 was obtained.

Comparative Example 5

The oxidation of the same polyethylene wax by the method described in Example 5 but without addition of acetic acid led, after 8.5 hours, to a wax oxidation product having an acid number of 18 mg KOH/g, a melt viscosity at 140° C. of 590 mPa.s and a color grade of 3.

What is claimed is:

1. A process for the oxidation, in the melt by means by oxygen or oxygen-containing gas mixtures, of polyethylene waxes prepared using metallocene catalysts, wherein the oxidation of the polyethylene wax is carried out with addition of monobasic or polybasic inorganic acids or monobasic or polybasic carboxylic acids having from 1 to 6 or from 2 to 6 carbon atoms, wherein the acids are added in an amount from 0.01 to 1.0% by weight based on the polyethylene wax.

2. The process as claimed in claim 1, wherein the polyethylene wax is a homopolymer of ethylene or a copolymer of ethylene with one or more $C_3$–$C_{18}$-α-olefins.

3. The process as claimed in claim 1, wherein the polyethylene wax is a copolymer of ethylene with propene or 1-butene.

4. The process as claimed in claim 1, wherein the acid used is hydrochloric, sulfuric or phosphoric acid or a monobasic or polybasic carboxylic acid having from 1 to 4 or from 2 to 4 carbon atoms.

5. The process as claimed in claim 1, wherein the acid used is phosphoric acid or acetic acid.

6. The process as claimed in claim 1, wherein the oxidation is carried out using air as oxidant at a pressure of from 1 to 3 bar.

7. The process as claimed in claim 1, wherein the reaction temperature is from 140 to 170° C.

8. The process as claimed in claim 1, wherein from 0.05 to 0.5% by weight of acid is used.

9. The process as claimed in claim 1, wherein the reaction is carried out continuously in a bubble column reactor.

* * * * *